United States Patent
Li et al.

(10) Patent No.: US 9,667,177 B1
(45) Date of Patent: May 30, 2017

(54) SYSTEM AND METHOD FOR OPERATING A THREE-PHASE LOAD FROM A SINGLE PHASE SOURCE

(71) Applicants: Eaton Corporation, Cleveland, OH (US); Zhejiang University, Hangzhou (CN)

(72) Inventors: Huaqiang Li, Menomonee Falls, WI (US); Wenxi Yao, Hangzhou (CN); Zhengyu Lu, Hangzhou (CN)

(73) Assignees: Eaton Corporation, Cleveland, OH (US); Zhejiang University (CN)

(*) Notice: Subject to any disclaimer, the term of this patent is extended or adjusted under 35 U.S.C. 154(b) by 0 days.

(21) Appl. No.: 14/969,872

(22) Filed: Dec. 15, 2015

(51) Int. Cl.
*H02P 1/26* (2006.01)
*H02P 27/06* (2006.01)

(52) U.S. Cl.
CPC .............. *H02P 1/265* (2013.01); *H02P 27/06* (2013.01)

(58) Field of Classification Search
CPC ........ H02M 1/44; H02M 5/4585; H02P 1/029
See application file for complete search history.

(56) References Cited

U.S. PATENT DOCUMENTS

2007/0211501 A1* 9/2007 Zargari ............... H02M 5/4585
363/39
2015/0311853 A1 10/2015 Swamy et al.

OTHER PUBLICATIONS

Dos Santos et al., "Single Phase to Three-Phase Power Converters: State of the Art," IEEE Transaction on Power Electronics, vol. 27, No. 5, May 2012, pp. 2437-2452.
Enjeti et al., "A New Single-Phase to Three-Phase Converter with Active Input Current Shaping for Low Cost ac Motor Drives," IEEE Transaction on Industry Applications, vol. 29, No. 4, Jul./Aug. 1993, pp. 806-813.
Bashaw et al., "B4 Topology Options for Operating Three Phase Induction Machines on Single Phase Grids," IEEE Applied Power Electronics Conference and Exposition, 2005, pp. 1894-1902.
Swamy et al., "An Improved Single-Phase Active-Front-End Rectifier System for Use With Three-Phase Variable-Frequency Drives," IEEE Transactions on Industry Applications, vol. 51, No. 2, Mar./Apr. 2015, pp. 1732-1742.
Swamy et al., "An Optimal Solution for Operating a Three-Phase Variable Frequency Drive From a Single-Phase AC Source", IEEE, 2014, pp. 1699-1706.

* cited by examiner

*Primary Examiner* — Karen Masih
(74) *Attorney, Agent, or Firm* — Ziolkowski Patent Solutions Group, SC (57) ABSTRACT

A power converter for operating a three-phase AC electrical machine from a single phase AC power source includes an ASD having a rectifier and inverter, and an add-on power conversion module external to the ASD that is electrically connected to each of the power source and the ASD. The power conversion module includes one or more input inductors configured to store and filter single-phase AC power received from the power source and a pair of switching devices connected to each of the input inductors at an output end thereof. A controller operably connected to the power conversion module selectively controls switching of the pair of switching devices associated with each of the one or more input inductors so as to cause a sinusoidal single phase AC power to be output from the add-on power conversion module for rectification by the rectifier.

21 Claims, 9 Drawing Sheets

SYSTEM AND METHOD FOR OPERATING A THREE-PHASE LOAD FROM A SINGLE PHASE SOURCE

BACKGROUND OF THE INVENTION

Embodiments of the invention relate generally to motor drive systems for operating a three-phase electric motor and, more particularly, to an apparatus and method for operating a three-phase motor from a single phase power source.

One type of system commonly used in industry that performs power conversion is an adjustable or variable speed drive (ASD) circuit, which is an industrial control device that provides for variable frequency, variable voltage operation of a driven system, such as a three-phase AC induction motor. ASDs have an AC to DC rectifier unit with a large DC capacitor to smooth the voltage ripple. In all ASDs, the DC bus voltage is inverted to three-phase variable voltage, variable frequency output to control the speed and torque of three-phase AC motors. For many loads, it is customary and often required to power up the AC to DC rectifier section from a three-phase AC source. However, the input AC to DC rectifier can be powered up from a single-phase AC source, especially in locations where three-phase AC power is unavailable due to logistics and other reasons. In such cases, some utilities allow three-phase ASDs to be powered from a single-phase AC source provided the peak current flowing into the AC to DC rectifier system is within the rating of the single-phase AC source. Many ASD manufacturers impose restrictions on the rating of the ASD when they are subject to a single phase AC source.

Figure 1:
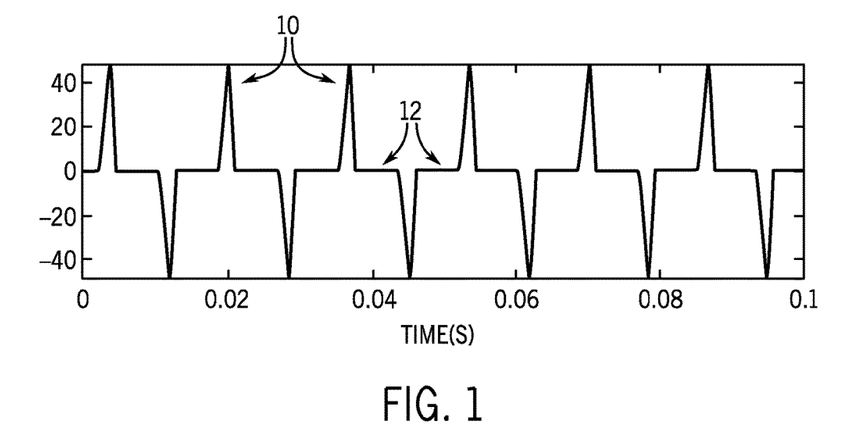
FIG. 1 illustrates a current waveform of a conventional single phase AC power source of an ASD.

There exist important concerns while operating a three-phase ASD from a single-phase AC source—with such concerns tied to high peak current and zero current conditions associated with a single phase AC power, as can be seen in the single phase AC waveform shown in FIG. 1 by high peak current 10 and zero current 12. With respect to the input AC current provided from the single phase AC source to the ASD, it is recognized that the input diodes of the ASD have to handle the higher demand current for a given load (with the RMS value of the input AC current being significantly higher than that when a three-phase supply is used for a given load), and thus de-rating of the inverter is often undertaken to address this concern—with the de-rating being ~50% in some cases. The higher input current affects the input AC power terminal blocks and, while in many cases the rectifier diodes of the ASD may be able to handle the higher values of RMS current, the terminal blocks and the rectifier diodes of the ASD may not be rated to handle the peak current on a continuous basis. An additional concern is that input harmonic distortion is high when single-phase input is used as an AC source for a three-phase inverter. Poor harmonics are associated with lower input power factor, which affects the efficiency of power conversion. Single-phase AC supply results in higher ripple voltage across the DC bus. Higher ripple voltage translates to higher ripple current through the DC bus capacitors and more heating of these capacitors. The inverter is typically de-rated to handle the higher ripple current. The current drawn from the single-phase AC source feeding a three-phase ASD is discontinuous. When the pulsed current flows from the AC source, it creates voltage drop that mimics the pulsed current waveform to some extent. The resulting voltage drop can affect other loads connected to the same AC source.

There are many known techniques that are employed to improve the current waveform and reduce the overall current harmonics—including both passive and active techniques. One known passive approach creates a resonant circuit across the DC bus, with energy being stored in the resonant components and released naturally at the appropriate time to support the sagging DC bus voltage and thereby reduce the ripple across the bulk capacitors of the DC bus. However, while the resonant circuit provides benefits of extending the diode conduction period during the charging cycle to reduce the input harmonics and improve the input power factor and reducing the DC bus capacitor ripple, it is recognized that the passive resonant circuit has disadvantages as well. These disadvantages include that the resonant components are bulky and expensive, the peak diode current is reduced but the improvement is not conspicuous, and the average DC bus voltage is still low and the ASDs need to be de-rated, though the level of de-rating is smaller than that without the DC bus resonant circuit.

One active solution commonly used in single-phase AC to DC power supplies uses a boost converter that boosts the input voltage to a desired DC bus voltage level under all load conditions. Use of the boost converter beneficially reduces the overall DC bus voltage ripple and makes the input current continuous, which reduces the input current harmonic distortion (thereby eliminating the peak current stress in the input diodes) and resulting in lower thermal loss in the AC system. However, it is recognized that the boost converter (and operation thereof) has disadvantages associated therewith of being expensive due to the boost switch having to be rated to carry peak of input current and to handle the boosted voltage (i.e., a large stress across the switch of the boost converter) and of requiring an input EMI filter to limit switching noise observed in the input AC voltage waveform from propagating into the AC source.

Figure 2:
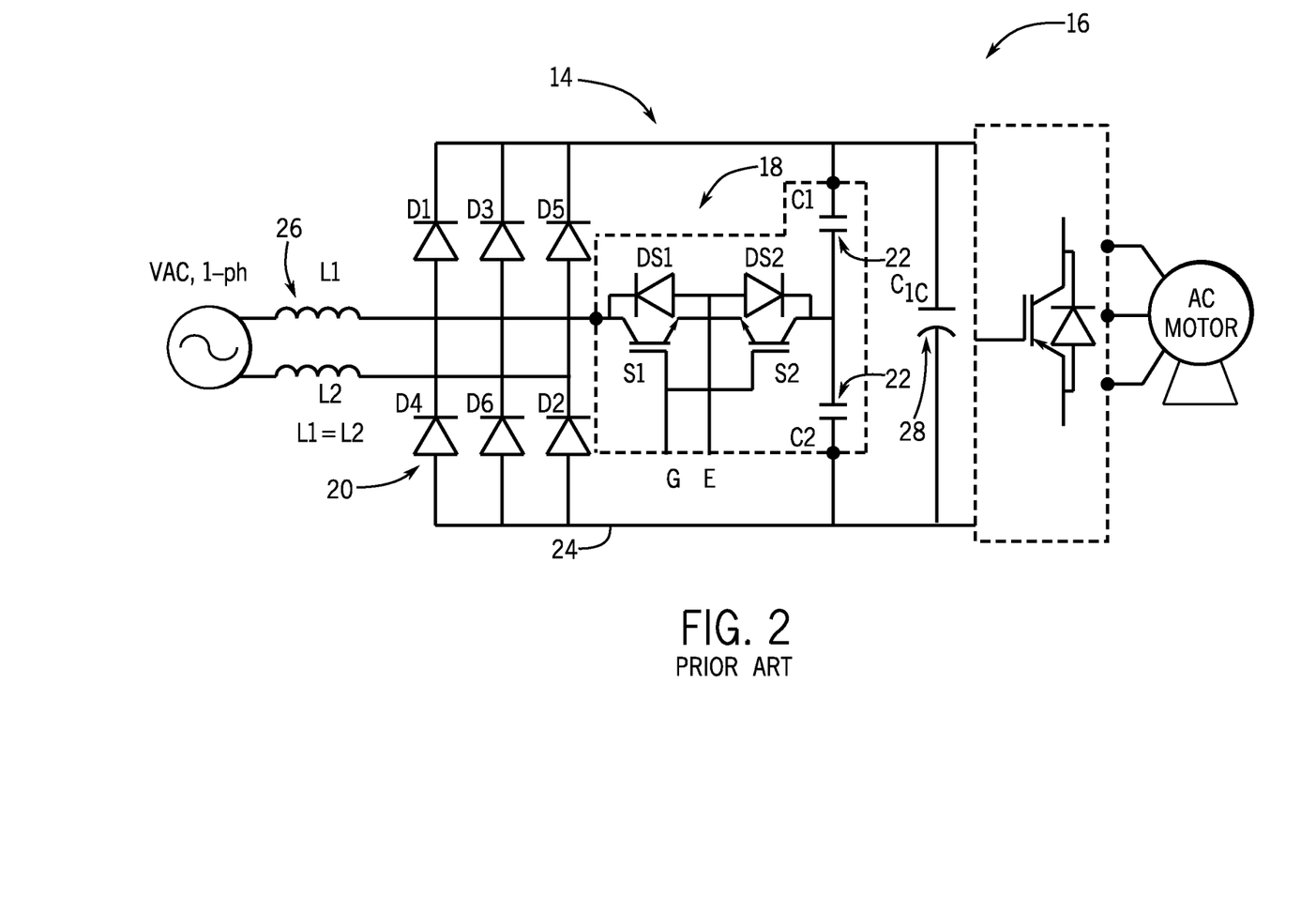
FIG. 2 is a schematic diagram of an ASD including a single phase active front end circuit, as known in the prior art.

One particular active solution used to improve the current waveform and reduce the overall current harmonics is disclosed in U.S. application Ser. No. 14/672,967. FIG. 2 illustrates a single phase front end circuit 14 for use with a ASD 16, where the front end circuit 14 includes a bidirectional switch 18 positioned between an input to the rectifier 20 and a midpoint 22 (formed by a pair of capacitors) positioned across the rails of the DC bus 24, so as to form a single-phase partial boost converter. The bidirectional switch 18 is controlled to inject current into the midpoint of the DC bus 24 even during the time when the input AC voltage is lower than the DC bus voltage, with such current being typically only about 50% of the rated current of the AC to DC rectifier. The current flow is limited by an external inductor 26, which behaves like a boost inductor boosting the main DC bus voltage when the switch is forced to turn of at sometime near to the peak of input AC voltage.

Figure 3:
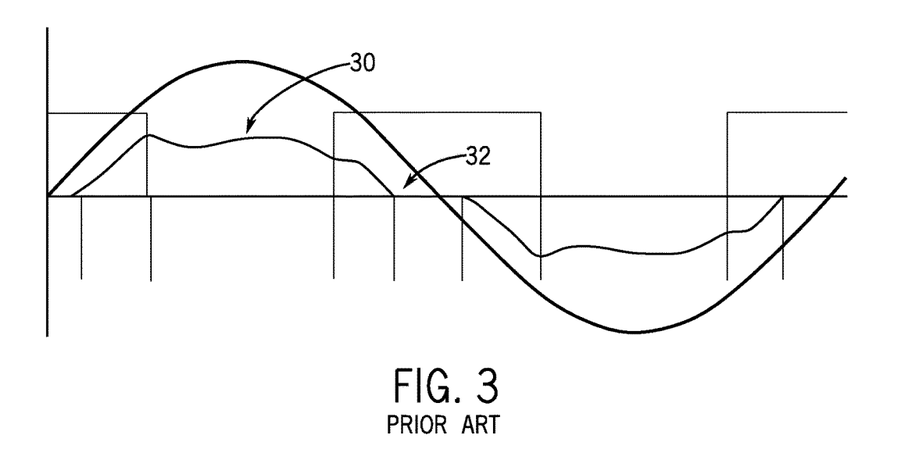
FIG. 3 illustrates a current waveform output from the single phase active front end circuit of FIG. 2.

However, while the front end circuit 14 operates to successfully reduce the ripple across the DC bus capacitor 28 and reduce the peak current flowing through the diodes of rectifier 20, the front end circuit 14 does not provide an optimum solution for conditioning the single phase current waveform and reducing the overall current harmonics, including such concerns tied to a high peak current and zero current conditions. As seen in FIG. 3, which illustrates a current waveform 30 output from the front end rectifier circuit 14 resulting from operation thereof (i.e., from operation of bidirectional switch 18), the current provided by the front end rectifier circuit 14 is non-sinusoidal—such that a large amount of total harmonic distortion is still present in the waveform. Additionally, periods/intervals are present where zero current (indicated at 32) is output from the front end circuit 14, which is problematic for operation ASD 16 in an optimum fashion.

It would therefore be desirable to have a system and method for operating a three-phase motor from a single phase power source that overcomes the aforementioned drawbacks. It would also be desirable for such a system and method to utilize a standard ASD with an add-on kit, to provide a non-intrusive solution that minimizes the cost, weight and size of the system in single phase applications, minimizing the need of large derating. It would still further be desirable for such a system and method to provide an input current harmonics reduction that makes it possible to meet industry regulatory power quality mandatory requirements.

BRIEF DESCRIPTION OF THE INVENTION

Embodiments of the invention are directed to a power converter and method of operating thereof for providing power to a three-phase motor from a single phase power source.

According to an aspect of the invention, a power converter for operating a three-phase AC electrical machine from a single phase AC power source comprises an adjustable speed drive (ASD) that includes a rectifier configured to convert a single-phase AC power to DC power on a DC bus, the DC bus having first and second rails to provide a relatively fixed DC voltage, and a DC bus capacitor across the first and second rails to smooth voltage ripple. The ASD also includes an inverter for receiving DC power from the DC bus and converting the DC power to a three-phase AC power, the inverter comprising a plurality of switches that are selectively controllable to control current flow and terminal voltages in the three-phase AC electrical machine. The power converter also includes an add-on power conversion module external to the ASD and electrically connected to each of the single phase AC power source and the ASD, with the add-on power conversion module having one or more input inductors configured to store and filter single-phase AC power received from the single phase AC power source and a pair of switching devices connected to each of the one or more input inductors at an output end thereof. The add-on power conversion module also includes a controller operably connected to the add-on power conversion module to selectively control switching of the pair of switching devices associated with each of the one or more input inductors so as to cause a sinusoidal single phase AC power to be output from the add-on power conversion module for rectification by the rectifier.

According to another aspect of the invention, a method for operating a three-phase AC electrical machine from a single phase power source includes providing a single phase AC power to an add-on power conversion module that includes one or more input inductors each comprising an input end and an output end and a pair of switching devices connected to each of the one or more input inductors at the output end thereof. The method also includes selectively switching each of the pair of switching devices associated with each of the one or more input inductors via an operably connected controller so as to cause a sinusoidal single phase AC power to be output from the add-on power conversion module, providing the sinusoidal single phase AC power to an adjustable speed drive (ASD) separate from and operably connected to the add-on power conversion module, and generating a three-phase AC power via the ASD for operating the three-phase AC electrical machine, with the ASD rectifying the sinusoidal single phase AC power to generate a DC power and inverting the DC power to generate the three-phase AC power.

According to yet another aspect of the invention, a power converter for operating a three-phase AC electrical machine from a single phase AC power source includes an adjustable speed drive (ASD) having an input connectable to an AC power source and a three phase output connectable to an input terminal of a load, the ASD comprising a housing enclosing a rectifier and inverter operable to provide a three-phase AC output to the load. The power converter also includes an add-on power conversion module positioned external to the housing of the ASD and being electrically connected to each of the single phase AC power source and the ASD, with the add-on power conversion module having one or more input inductors positioned at an input of the add-on power conversion module connected to the single phase AC power source and a pair of switching devices connected to each of the one or more input inductors at an output end thereof. The power converter further includes a controller operably connected to the add-on power conversion module to selectively control switching of the pair of switching devices associated with each of the one or more input inductors, wherein the controller is programmed to control switching of the pair of switching devices so as to cause a sinusoidal single phase AC power to be output from the add-on power conversion module, the sinusoidal single phase AC power output having a total harmonic distortion of less than 5%.

Various other features and advantages of the present invention will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION

Embodiments of the invention are directed to a power converter and method of operating thereof for providing power to a three-phase motor from a single phase power source. The power converter includes an adjustable speed drive (ASD) and an add-on module connected to the ASD, with the add-on module configured to condition a single phase AC input received thereby for providing to the ASD, so as to reduce a total harmonic distortion of an input current and minimize the need to derate the ASD.

Figure 4:
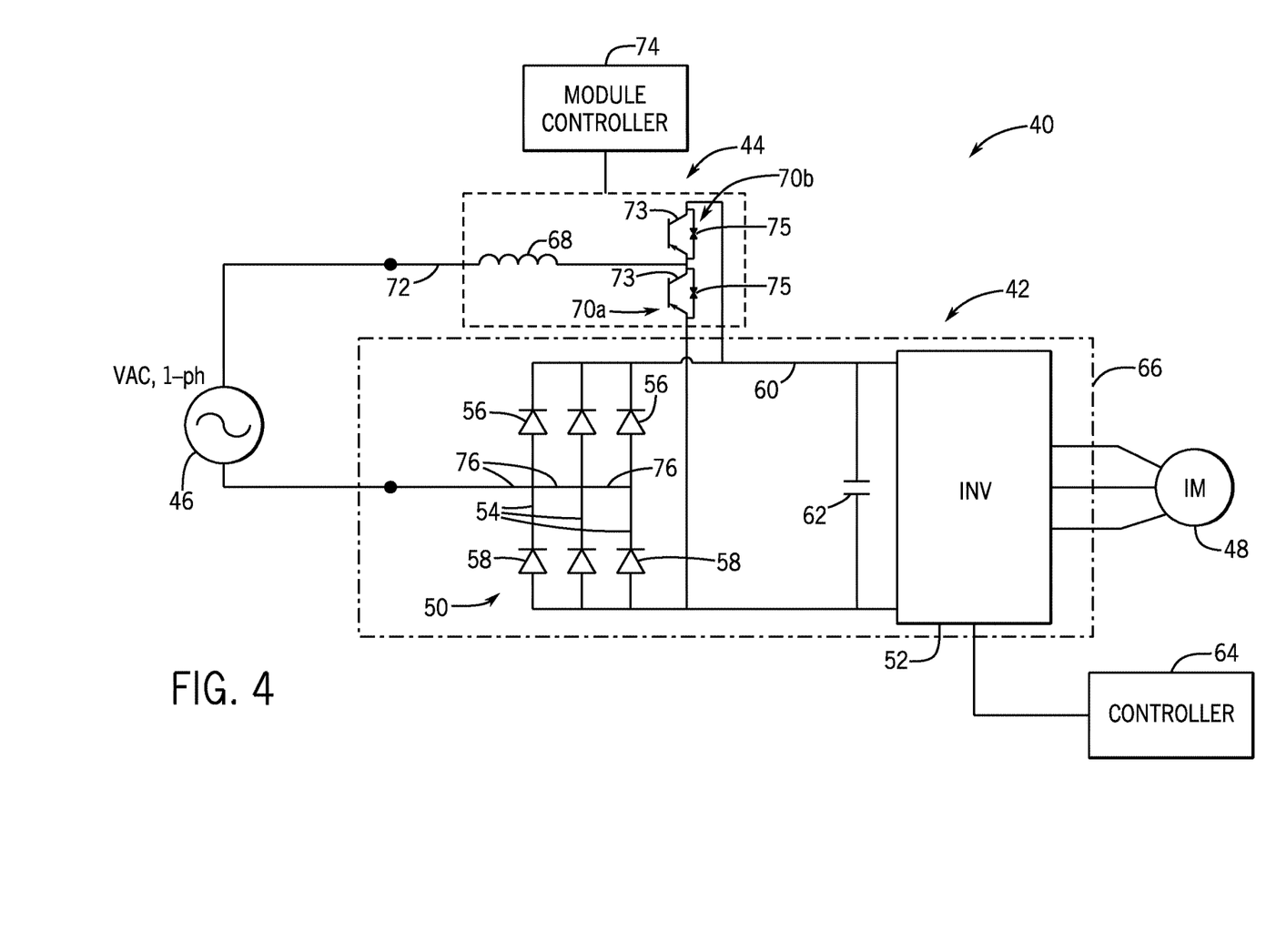
FIG. 4 is a schematic diagram of a power converter including an ASD and an add-on power conversion module, according to an embodiment of the invention.

Referring to FIG. 4, a power converter 40 is illustrated according to an embodiment of the invention. The power converter 40 is composed generally of an ASD 42 and an add-on power conversion module 44 that operates in conjunction with the ASD 42 to receive a single phase AC power input from a single phase AC power source 46, condition the single phase AC power input, rectify the conditioned AC input, and perform a DC/AC conversion of the rectified segment into a three-phase alternating voltage of variable frequency and amplitude that is supplied to a load 48.

As shown in FIG. 4, the ASD 42 is constructed as a conventional motor drive having a standard construction, such that the ASD 42 includes a three-phase rectifier bridge 50 and a inverter circuit 52 for performing rectification and inversion of a received AC input. The three-phase rectifier bridge 50 includes three bridge legs 54—each of which includes an upper diode 56 and a lower diode 58 thereon. An AC input may be fed to the three-phase rectifier bridge 50, with the rectifier bridge 50 converting the AC power input to a DC power such that a DC voltage is present on DC link 60 between the rectifier bridge 14 and the inverter 52. The link voltage is smoothed by a DC link capacitor bank 62. The inverter 52 may be comprised of a series of insulated gate bipolar transistor switches (IGBTs) and anti-parallel diodes (not shown), such as an arrangement of six IGBTs and diodes, that collectively form inverter 52—with the inverter 52 being controlled via a pulse width modulation (PWM) technique, for example, to synthesize AC voltage waveforms with a fixed frequency and amplitude for delivery to the load 48, which is in the form of a three-phase electrical machine such as an induction motor, for example. While the inverter 52 is described above as including IGBTs, it is recognized that other embodiments of the invention contemplate other power switching devices as known in the art, such as MOSFETs, for example.

Control of the ASD 42 and operation of the inverter 52 is via a controller 64, which may further be comprised of a plurality of controllers that perform high speed operations such as volts-per-hertz or vector control algorithms, space-vector modulation, DC link voltage decoupling, and protection, for example. The controller system 64 interfaces to the inverter 52 via gate drive signals and sensing of the DC link voltage and pole currents (by way a voltage sensor and current sensors, for example) such that changes in DC link voltage can be sensed. These voltage changes can be interpreted as transient load conditions and are used to control switching of the switches of inverter 52 such that near steady-state load conditions are maintained.

The add-on power conversion module 44 is positioned external to the ASD 42 (i.e., outside of a housing 66 enclosing ASD 42) and is electrically connected thereto. Accordingly, the add-on power conversion module 44 may be implemented with an existing ASD 42 and electrically tied thereto to "retrofit" an existing ASD 42. According to the embodiment of FIG. 4, the add-on power conversion module 44 is composed of an input inductor 68 and a pair of switching devices 70a, 70b that operate to condition the single phase AC power provided from single phase source. The input inductor 68 is positioned on an input terminal 72 of the power conversion module 44 to receive a single phase AC power from source 46, with the input inductor 68 providing energy storage and filtering during operation of power converter 40 and load 48. While power conversion module 44 is shown in FIG. 4 as including only a single input inductor 68 positioned at input terminal 72, it is recognized that, in another embodiment, the input inductor 68 could be split onto two input terminals of the power conversion module 44, so as to provide common mode rejection capability.

In an exemplary embodiment, each of the pair of switching devices 70a, 70b included in power conversion module 44 are provided as an IGBT 73 and anti-parallel diode 75. While the switching devices 70a, 70b are shown as including IGBTs, it is recognized that other embodiments of the invention contemplate other power switching devices as known in the art, such as MOSFETs, for example. The switching devices 70a, 70b are arranged to provide a half-bridge circuit topology, with the switches being controlled according to a PWM scheme to condition the AC power received from the power source 46 to an AC waveform. Switching devices 70a, 70b are operated in an alternating manner in which one switch is an on state while the other switch is in the off state. Controlling which switching device 70a, 70b is in the on state via the PWM scheme causes the AC waveform output therefrom to be generated according to a desired frequency. Control of the switching devices 70a, 70b may be provided via a dedicated controller 74 associated with power conversion module 44. Alternatively, control of the switching devices 70a, 70b may be provided via controller 64, such that controller 64 controls operation of both the ASD 42 and the power conversion module 44.

While ASD 42 is described above as comprising a conventional motor drive having a standard construction, it is seen in FIG. 4 that the ASD 42 is modified in several respects. First, it is seen in FIG. 4 that DC link chokes that are typically positioned on the positive and negative rails of the DC link 60 (for providing energy storage and filtering on the DC link) are not present—i.e., they may be removed. That is, the inclusion of the input inductor 68 in the power conversion module 44 allows for removal of such DC link chokes, as functions of the DC link chokes are performed by the input inductor 68. Additionally, it is seen in FIG. 4 that the AC inputs 76 to the three-phase rectifier bridge 50—which are typically provided via a plurality of separate input terminals to the legs 54 of the rectifier bridge 50—are tied together in the ASD 42 and are connected to respective midpoints 77 of the legs 54, such that the upper and lower diodes 56, 58 of the three-phase rectifier bridge 50 share the full load current in the ASD 42 during operation, as will be explained in further detail below.

Figure 5:
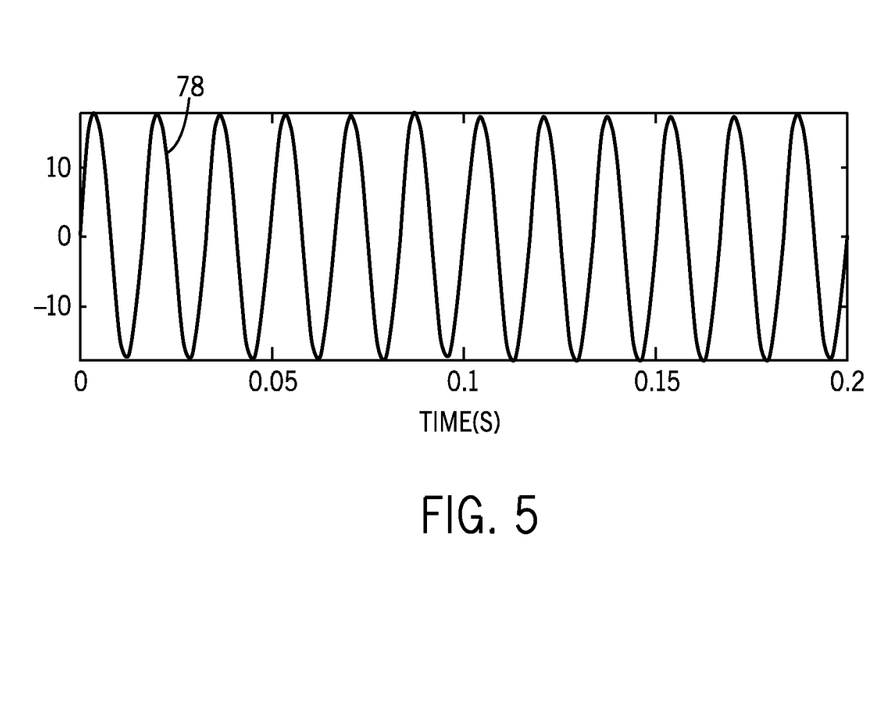
FIG. 5 illustrates a current waveform output from the add-on power conversion module of FIG. 4.

In operation of power converter 40, power is provided from the single phase AC source 46 to the add-on power conversion module 44. Upon receiving the single phase AC power, the state of switching devices 70a, 70b is controlled by controller 74 to selectively provide for a flow of power therethrough, with switching of the switching devices 70a, 70b being performed with a selected variable duty cycle to provide for conditioning of the AC power. Power is selectively stored and filtered in/by the input inductor 68 during operation of the switching devices 70a, 70b so as to provide a conditioned AC power output from the power conversion module 44 having a desired waveform that induces less stress across the diodes 56, 58 of the rectifier 50 and reduces the ripple current into the DC link capacitor bank 62. As shown in FIG. 5, based on the controlling of switching devices 70a, 70b, a sinusoidal AC power 78 is output from the power conversion module 44 having a reduced peak current. The purely sinusoidal AC current waveform 78 output from the power conversion module 44 has a lower peak current value than the single phase AC power provided to the power conversion module 44 from the AC source 46, with the presence of any intermittent zero current condition being removed—in contrast to existing front end circuits and associated drives that operate a three-phase motor from a single phase power source.

Figure 6A:
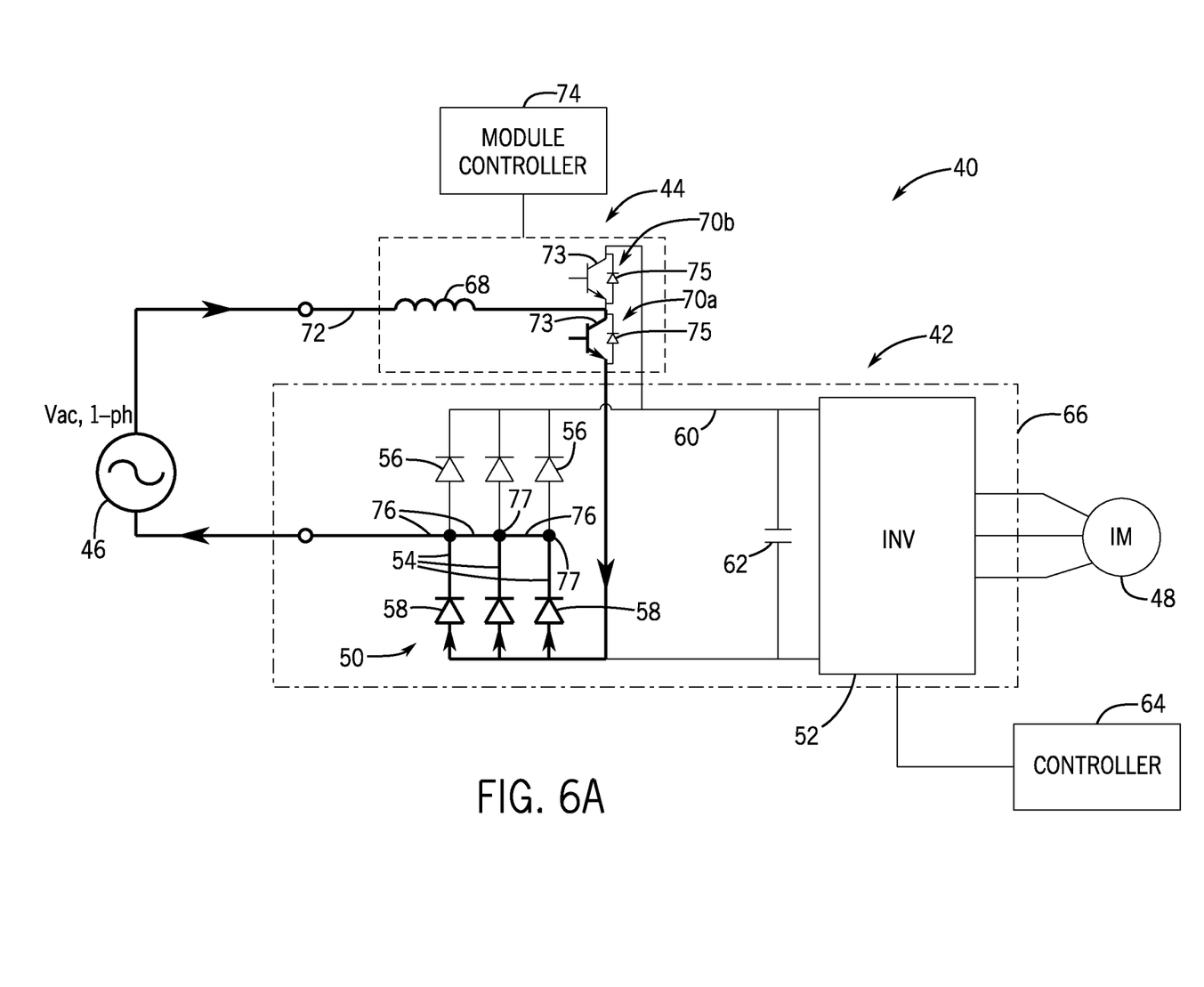
FIGS. 6A-6D illustrate current flows through the power converter of FIG. 4 corresponding to different switching patterns of switches in the add-on power conversion module.

Referring now to FIGS. 6A-6D, operation of the power conversion module 44 in four different operating modes and the current flows through the power converter 40 resulting therefrom are illustrated in greater detail. Referring first to FIG. 6A, operation of the power conversion module 44 in a first mode is illustrated—in which a positive current flow is output from single phase AC power source 46 and a charging of the input inductor 68 is performed. In the first mode of operation, IGBT 73 of switching device 70a is in a conducting state such that current is allowed to flow therethrough in a modulated fashion. Specifically, current flows in a first/positive direction from power source 46, through input inductor and through IGBT 73 of switching device 70a, so as to be output from power conversion module 44 to ASD 42. The sinusoidal single phase AC power output from the power conversion module 44 (through IGBT 73 of switching device 70a) is provided to the ASD 42 and is fed to the three-phase rectifier bridge 50. In receiving the single phase AC power at the three-phase rectifier bridge 50, the connection of the tied inputs 76 to the midpoints 77 of the rectifier bridge legs 54 causes current to flow through the three lower diodes 58 in parallel—with the paralleling of the three lower diodes 58 serving to equally divide the full load current of AC power input to the three-phase rectifier bridge 50, so as to reduce the current flow through each diode and thereby drastically reduce or eliminate the need to de-rate the ASD 42 (i.e., de-rate from 0% to less than 50%). As can be seen in FIG. 6A, the flow of current continues out through tied inputs 76 and back into power source 46, with current flow along the illustrated flow path continuing in the first mode until a build-up/charging of energy in the input inductor 68 has reached a desired level.

Figure 6B:
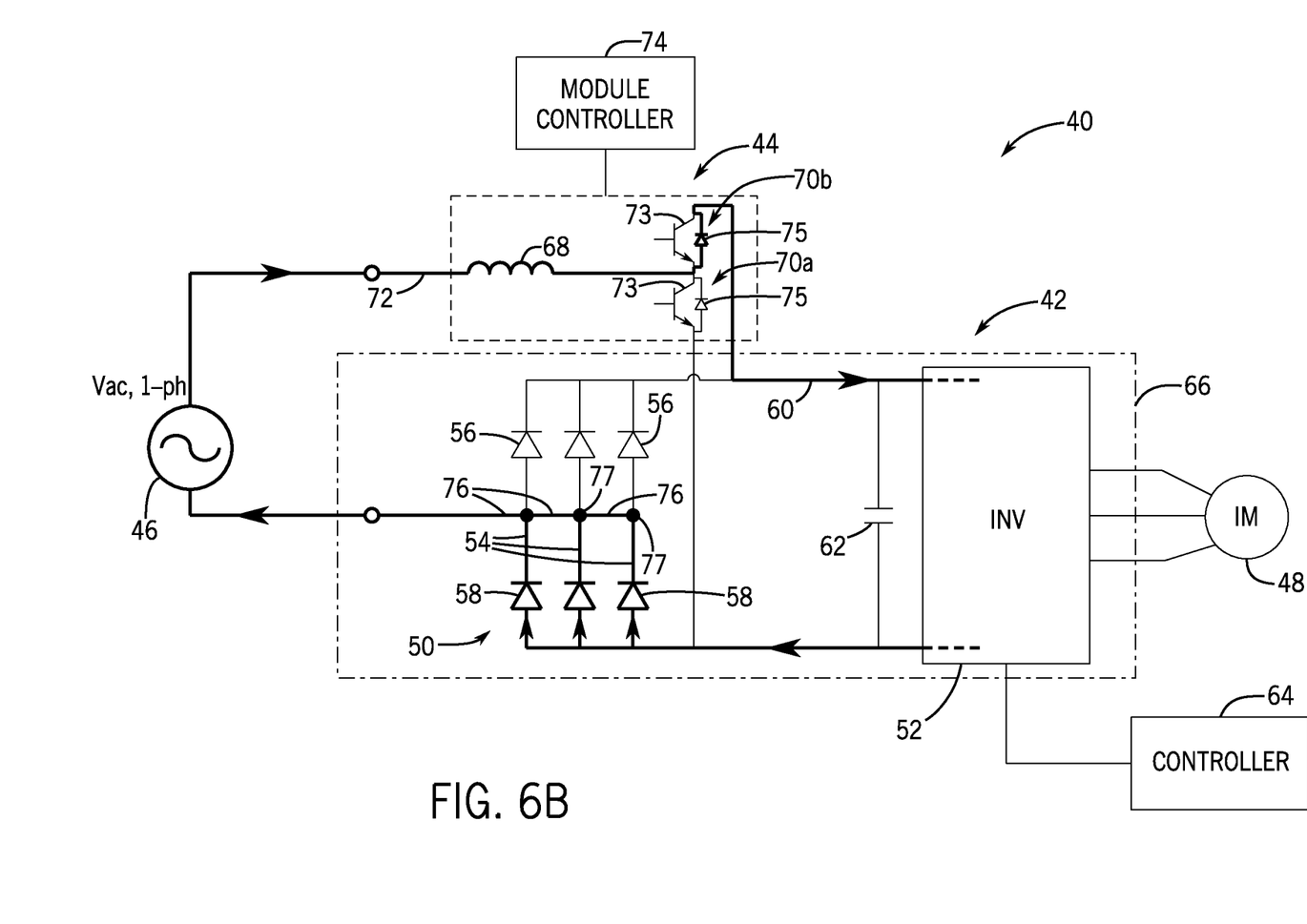

Upon a build-up of energy in input inductor 68 reaching a desired level, the power conversion module 44 then changes to a second operating mode, as illustrated in FIG. 6B. In the second operating mode, with a positive current flow being output from single phase AC power source 46, a releasing of the energy stored in the input inductor 68 is performed. In the second mode of operation, IGBT 73 of switching device 70a is in a non-conducting state such that current is caused to flow through the diode 75 of switching device 70b. Accordingly, current flows from power source 46, through input inductor and through the diode 75 of switching device 70b, so as to be output from power conversion module 44 to ASD 42. The power output from the power conversion module 44 during the second mode of operation is provided to the ASD 42 and is fed to the DC link 60 so as to provide power to the inverter 52 for inversion/conditioning and output to the load 48. As further shown in FIG. 6B, power output from the power conversion module 44 during the second mode of operation is also routed through the three lower diodes 58 of the rectifier bridge 50 in parallel (as previously described with respect to FIG. 6A) and out through tied inputs 76 back to power source 46.

Figure 6C:
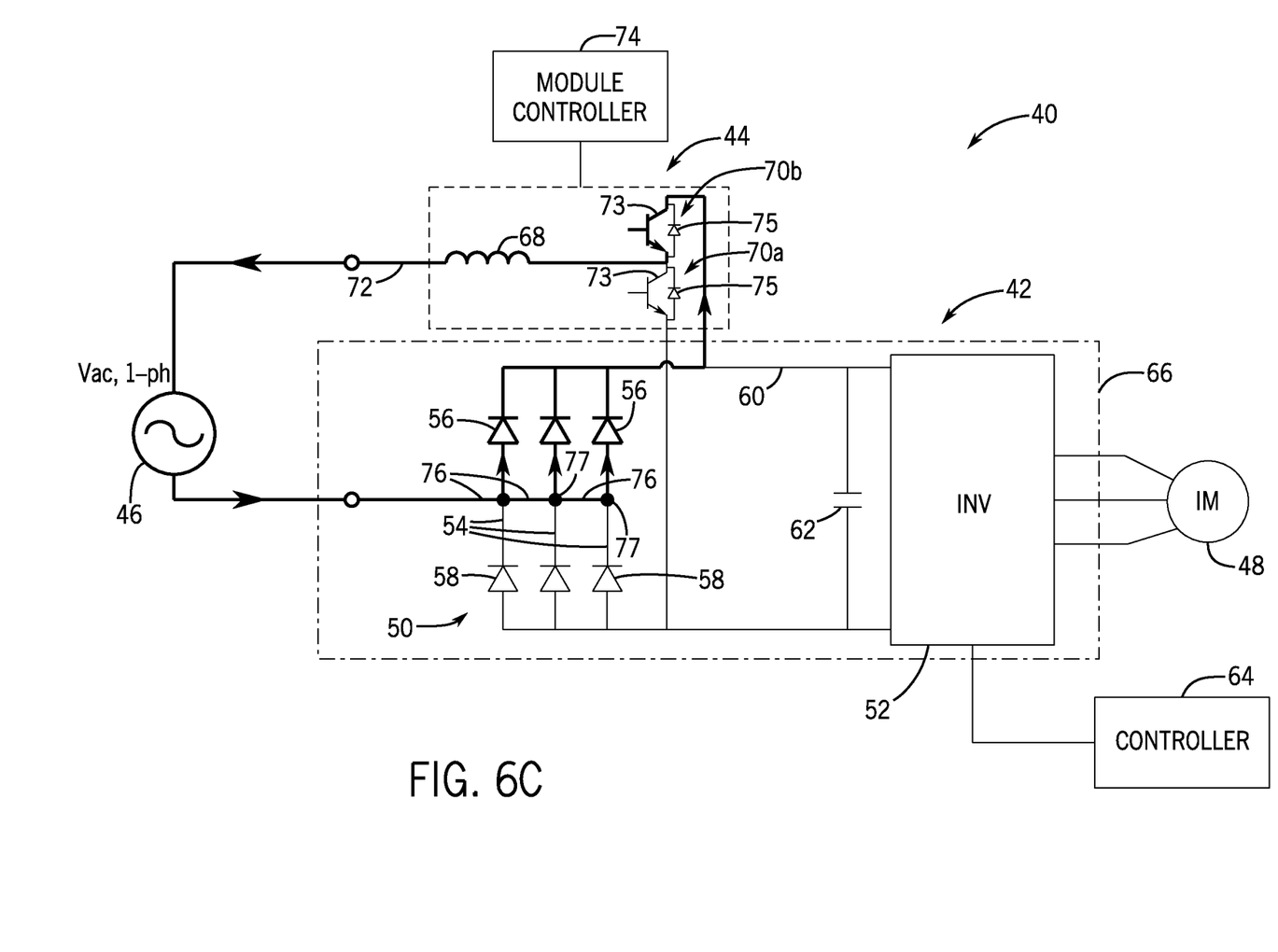

Referring now to FIG. 6C, operation of the power conversion module 44 in a third mode is illustrated—in which a negative current flow is output from single phase AC power source 46 and a charging of the input inductor 68 is performed. In the third mode of operation, IGBT 73 of switching device 70b is in a conducting state such that current is allowed to flow therethrough in a modulated fashion. Specifically, current flows in a second/negative direction from power source 46, through upper diodes 56 of rectifier bridge 50, through IGBT 73 of switching device 70b, and to input inductor 68 to provide for a build-up or charging of energy therein. As shown in FIG. 6B, negative current output from power source 46 is fed to the tied inputs 76 and provided to the three-phase rectifier bridge 50. In receiving the negative current at the three-phase rectifier bridge 50, the connection of the tied inputs 76 to the midpoints 77 of the rectifier bridge legs 54 causes current to flow through the three upper diodes 56 in parallel—with the paralleling of the three upper diodes 56 serving to equally divide the full load current of AC power input to the three-phase rectifier bridge 50, so as to reduce the current flow through each diode. Upon flowing through the three upper diodes 56, the flow of current is provided to the power conversion module 44 such that it is caused to flow through IGBT 73 of switching device 70b in a modulated fashion and then to/through the input inductor 68. As can be seen in FIG. 6C, the flow of current continues in the second direction back into power source 46, with current flow along the illustrated flow path continuing in the third mode until a build-up/charging of power in the input inductor 68 has reached a desired level.

Figure 6D:
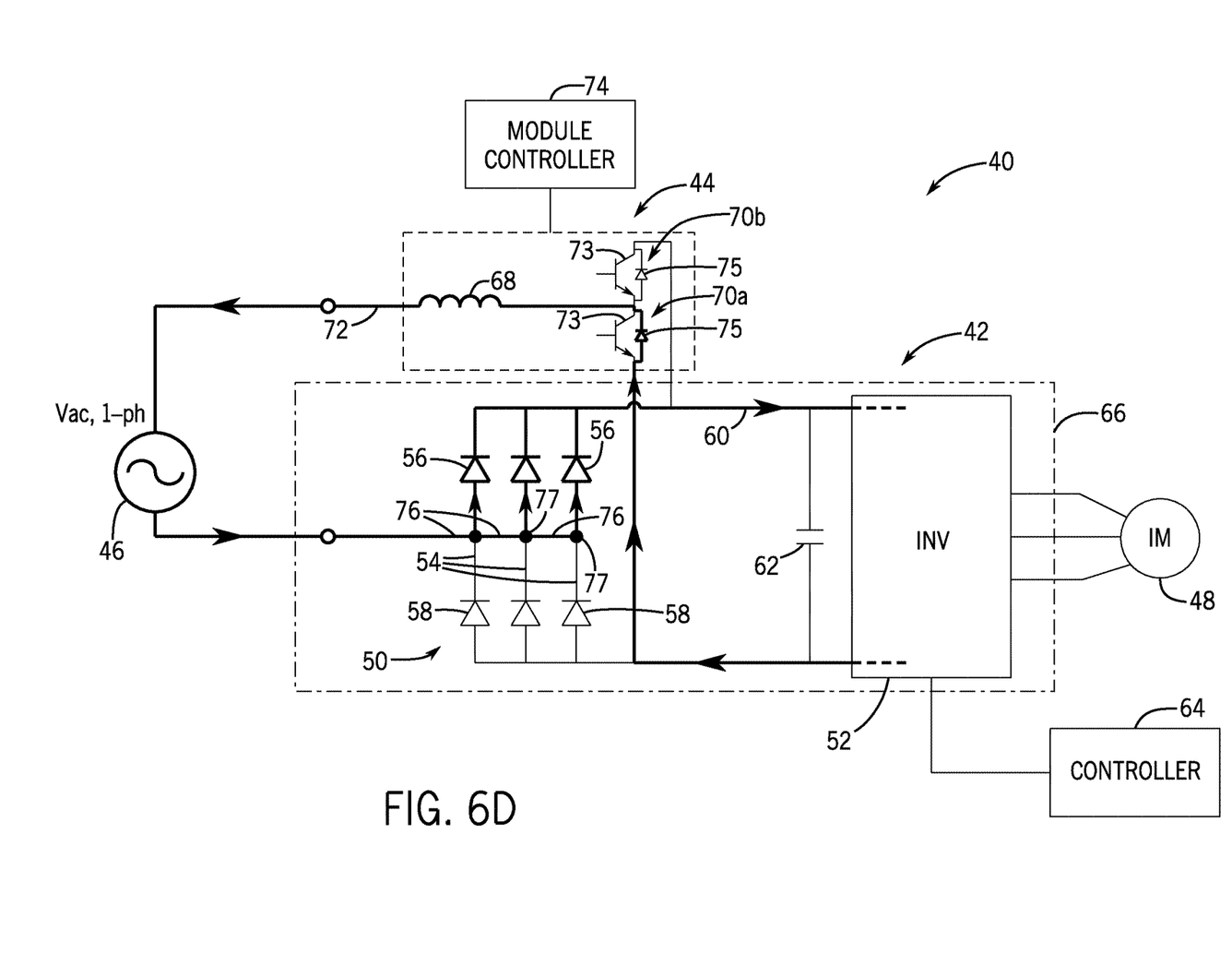

Upon a build-up of energy in input inductor 68 reaching a desired level, the power conversion module 44 then changes to a fourth operating mode, as illustrated in FIG. 6D. In the fourth operating mode, with a negative current flow being output from single phase AC power source 46, a releasing of the energy stored in the input inductor 68 is performed. In the fourth mode of operation, IGBT 73 of switching device 70b is in a non-conducting state such that current is caused to flow through the diode 75 of switching device 70a. Accordingly, power output from the power conversion module 44 during the fourth mode of operation (i.e., released from input inductor 68) flows through upper diodes 56 of rectifier bridge 50 and is fed to the DC link 60 so as to provide power to the inverter 52 for inversion/conditioning and output to the load 48. As further shown in FIG. 6D, current that flows through three upper diodes 56 (and to inverter 52) is also caused to flow through the diode 75 of switching device 70a and out from power conversion module 44 back to power source 46.

While the power converter 40 illustrated in FIG. 4 and FIGS. 6A-6D is shown as having the inputs 76 to the ASD 42 being tied to the midpoint 77 on each of the three bridge legs 54 of rectifier 50, it is recognized that not all inputs 76 need be tied to the midpoints 77. That is, according to additional embodiments of the invention, the inputs 76 may only be tied to one or two of the bridge leg midpoints 77. In such embodiments, current would only flow through the diodes 56, 58 on the bridge legs 54 to which the inputs 76 are tied to the midpoints 77—such that current could flow through two diodes in parallel or only through a single diode.

Addition of the add-on power conversion module 44 to an existing ASD 42 thus provides for input of a pure sinusoidal AC power output 78 to be supplied to the ASD 42 that has a lower peak current value than a current provided directly from a single phase AC power source. The sinusoidal current waveform 78 output from the add-on power conversion module 44 has a reduced total harmonic distortion as compared to the current waveform output directly from the single phase AC power source 46—with total harmonic distortion of the sinusoidal current waveform 78 being less than 5%. Additionally, the tying of inputs 76 to the midpoints of the rectifier legs 54 and the resulting paralleling of the three upper diodes 56 and the three lower diodes 58 provides for the equal division of the full load current of AC power input to the three-phase rectifier bridge 50, so as to reduce the current flow through each diode and thereby reduce/eliminate the need to de-rate the ASD 42.

Figure 7:
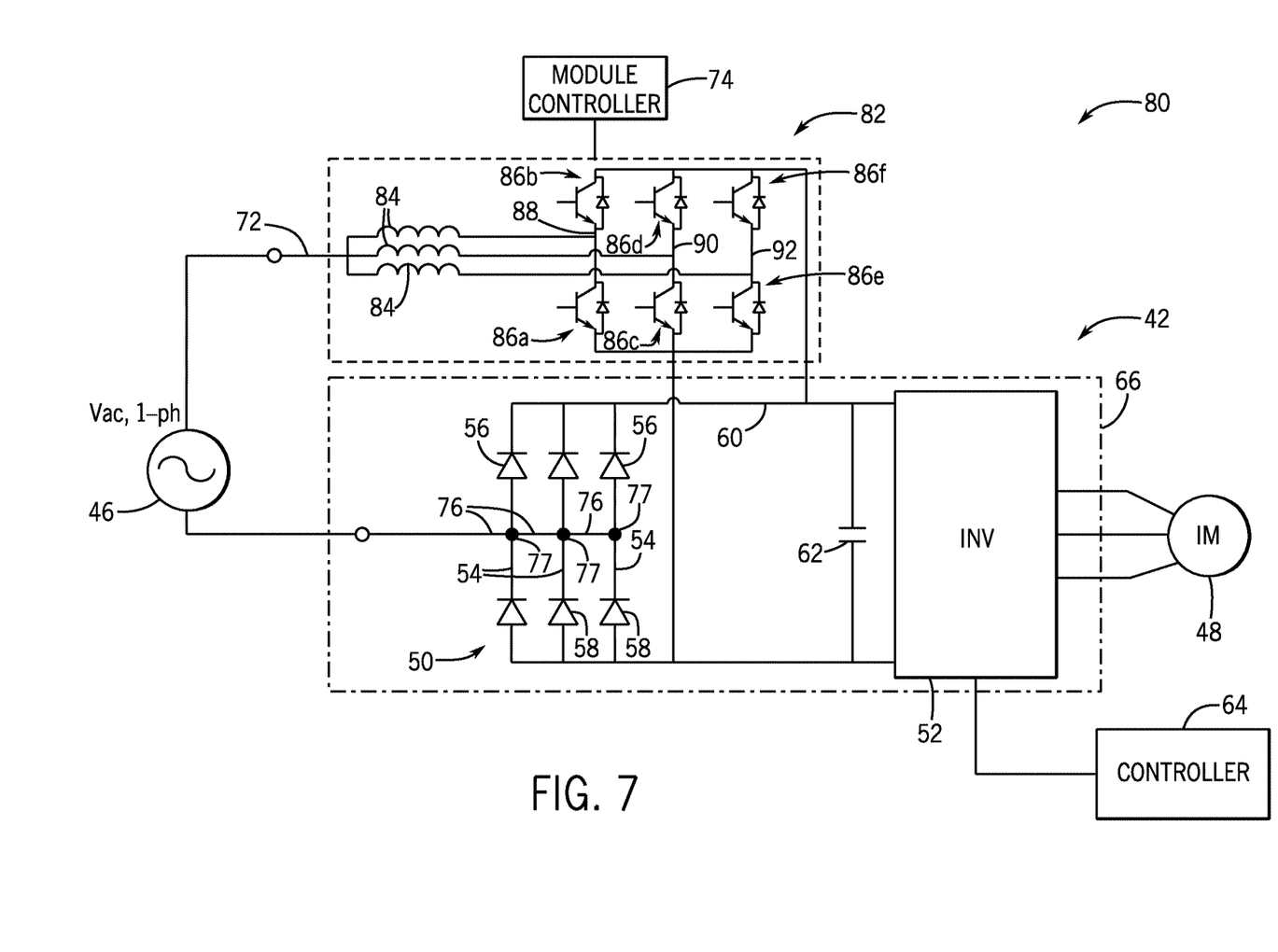
FIG. 7 is a schematic diagram of a power converter including an ASD and an add-on power conversion module, according to an embodiment of the invention.

Referring now to FIG. 7, a power converter 80 is illustrated according to another embodiment of the invention. The power converter 80 is composed generally of an ASD 42 and an add-on power conversion module 82 that operates in conjunction with the ASD 42 to receive a single phase AC power input, condition the single phase AC power input, rectify the conditioned AC input, and perform a DC/AC conversion of the rectified segment into a three-phase alternating voltage of variable frequency and amplitude that is supplied to a load 48. The construction of ASD 42 is identical to the ASD 42 included in the power converter 40 of FIG. 4, and thus ASD 42 and the components thereof in the power converter 80 of FIG. 7 are numbered likewise to the ASD 42 and the components thereof in the power converter of FIG. 4.

As shown in FIG. 7, the add-on power conversion module 82 of power converter 80 is positioned external to the ASD 42 (i.e., outside of housing 66 enclosing ASD 42) and is electrically connected thereto. Accordingly, the add-on power conversion module 82 may be implemented with an existing ASD 42 and electrically tied thereto to "retrofit" an existing ASD 42. According to the embodiment of FIG. 7, the add-on power conversion module 82 is composed of three single phase AC input inductors 84 and six switching devices 86*a*, 86*b*, 86*c*, 86*d*, 86*e*, 86*f* (each including an IGBT 73 (or MOSFET) and anti-parallel diode 75) that operate to condition the single phase AC power provided from single phase source 46. The input inductors 84 are positioned/arranged on an input terminal 72 of the power conversion module 82 to receive a single phase AC power from source, with the input inductors 84 providing energy storage and filtering during operation of power converter 80 and load 48. While power conversion module 82 is shown in FIG. 7 as including only the three input inductors 84 positioned at input terminal 72, it is recognized that, in another embodiment, the input inductors could be split onto two input terminals, so as to provide common mode rejection capability.

As shown in FIG. 7, the switching devices 86*a*, 86*b*, 86*c*, 86*d*, 86*e*, 86*f* are arranged such that a pair or group of switching devices is provided on each of three bridge legs 88, 90, 92—with switching devices 86*a*, 86*b* on leg 88, switching devices 86*c*, 86*d* on leg 90, and switching devices 86*e*, 86*f* on leg 92. The pair/group of switching devices on each leg—i.e., switching devices 86*a*, 86*b* on leg 88, switching devices 86*c*, 86*d* on leg 90, and switching devices 86*e*, 86*f* on leg 92—may be switched in a certain time sequence from interleaving (i.e., interleaved switching) to provide an output current with a desired waveform, with the switching being performed according to a PWM scheme to condition the AC power received from the single phase power source 46 to a desired sinusoidal AC waveform on the output. Beneficially, the interleaved switching of the switching devices 86*a*, 86*b*, 86*c*, 86*d*, 86*e*, 86*f* increases the effective switching frequency of the power conversion module 82 (as compared to the effective switching frequency of the power conversion module 44 of FIG. 4), as switching of each pair/group of switching devices 86*a* and 86*b*, 86*c* and 86*d*, 86*e* and 86*f* at 5 kHz would result in an overall effective switching frequency of 15 kHz for the power conversion module 82, for example. Of further benefit, the inclusion of a pair of switching devices on each of the three bridge legs 88, 90, 92 in a skewed arrangement—along with the selective and independent switching of the IGBT 73 in each switching device—enables the switching devices 86*a*, 86*b*, 86*c*, 86*d*, 86*e*, 86*f* on each leg to carry only one third of the load current provided from the single phase AC power source 46. Control of the switching devices 86 may be provided via a dedicated controller 74 associated with the power conversion module 82. Alternatively, control of the switching devices 86 may be provided via controller 64, such that controller 64 controls operation of both the ASD 42 and the power conversion module 82.

Similar to the operation of the power conversion module 44 (FIG. 4 and FIGS. 6A-6D), it is recognized that power conversion module 82 is operable in four different operating modes based on the conductive state of each of the switching devices 86*a*, 86*b*, 86*c*, 86*d*, 86*e*, 86*f*. First and second operating modes may be implemented during periods of a positive current being output from single phase AC power source 46—with the first and second operating modes providing for an energy build-up in input inductors 84 and energy release from input inductors 84, respectively. Third and fourth operating modes may be implemented during periods of a negative current being output from single phase AC power source 46—with the third and fourth operating modes providing for an energy build-up in input inductors 84 and energy release from input inductors 84, respectively. The flow of current through power converter 80 and ASD 42 is dictated by the selective and independent switching of the IGBT 73 in each switching device 86*a*, 86*b*, 86*c*, 86*d*, 86*e*, 86*f*, with current flow paths in the four operating modes being essentially similar to those illustrated in FIGS. 6A-6D.

Beneficially, inclusion of the arrangement of six switching devices 86 and three input inductors 84 in the power conversion module 82—and the switching of the switching devices 86 at a high frequency—allows for the size of the input inductors 84 to be reduced. That is, because each phase input inductor 84 only carries one third of the load current and the equivalent switching frequency is three times that of each individual bridge leg 88, the overall inductor size can be scaled down significantly. The size/rating of each switching device 86 (i.e., the IGBT) can be reduced, with the rating of each switching device 86 being one third of the load current rating. It is also recognized that inclusion of the arrangement of six switching devices 86 and three input inductors 84 in the power conversion module 82 allows for an even further reduction in the total harmonic distortion present in the sinusoidal current waveform output from the power conversion module 82—with total harmonic distortion of the sinusoidal current waveform being approximately 3%.

As set forth in the above descriptions of the power converters 40, 80, embodiments of the invention thus provide an add-on power conversion module that may be utilized with a standard, existing ASD to operate a three-phase motor from a single phase power source. The add-on power conversion module provides a non-intrusive solution that minimizes the cost, weight and size of a power converter system in single phase applications, such as by negating the need for DC link chokes in the ASD, without the need of large derating of the ASD. The add-on power conversion module reduces input current harmonics so as to make it possible to meet industry regulatory power quality mandatory requirements.

Therefore, according to an embodiment of the invention, a power converter for operating a three-phase AC electrical machine from a single phase AC power source comprises an adjustable speed drive (ASD) that includes a rectifier configured to convert a single-phase AC power to DC power on a DC bus, the DC bus having first and second rails to provide a relatively fixed DC voltage, and a DC bus capacitor across the first and second rails to smooth voltage ripple. The ASD also includes an inverter for receiving DC power from the DC bus and converting the DC power to a three-phase AC power, the inverter comprising a plurality of switches that are selectively controllable to control current flow and terminal voltages in the three-phase AC electrical machine. The power converter also includes an add-on power conversion module external to the ASD and electrically connected to each of the single phase AC power source and the ASD, with the add-on power conversion module having one or more input inductors configured to store and filter single-phase AC power received from the single phase AC power source and a pair of switching devices connected to each of the one or more input inductors at an output end thereof. The add-on power conversion module also includes a controller operably connected to the add-on power conversion module to selectively control switching of the pair of switching devices associated with each of the one or more input inductors so as to cause a sinusoidal single phase AC power to be output from the add-on power conversion module for rectification by the rectifier.

According to another embodiment of the invention, a method for operating a three-phase AC electrical machine from a single phase power source includes providing a single phase AC power to an add-on power conversion module that includes one or more input inductors each comprising an input end and an output end and a pair of switching devices connected to each of the one or more input inductors at the output end thereof. The method also includes selectively switching each of the pair of switching devices associated with each of the one or more input inductors via an operably connected controller so as to cause a sinusoidal single phase AC power to be output from the add-on power conversion module, providing the sinusoidal single phase AC power to an adjustable speed drive (ASD) separate from and operably connected to the add-on power conversion module, and generating a three-phase AC power via the ASD for operating the three-phase AC electrical machine, with the ASD rectifying the sinusoidal single phase AC power to generate a DC power and inverting the DC power to generate the three-phase AC power.

According to yet another embodiment of the invention, a power converter for operating a three-phase AC electrical machine from a single phase AC power source includes an adjustable speed drive (ASD) having an input connectable to an AC power source and a three phase output connectable to an input terminal of a load, the ASD comprising a housing enclosing a rectifier and inverter operable to provide a three-phase AC output to the load. The power converter also includes an add-on power conversion module positioned external to the housing of the ASD and being electrically connected to each of the single phase AC power source and the ASD, with the add-on power conversion module having one or more input inductors positioned at an input of the add-on power conversion module connected to the single phase AC power source and a pair of switching devices connected to each of the one or more input inductors at an output end thereof. The power converter further includes a controller operably connected to the add-on power conversion module to selectively control switching of the pair of switching devices associated with each of the one or more input inductors, wherein the controller is programmed to control switching of the pair of switching devices so as to cause a sinusoidal single phase AC power to be output from the add-on power conversion module, the sinusoidal single phase AC power output having a total harmonic distortion of less than 5%.

Embodiments of the present invention have been described in terms of the preferred embodiment, and it is recognized that equivalents, alternatives, and modifications, aside from those expressly stated, are possible and within the scope of the appending claims.

What is claimed is:

1. A power converter for operating a three-phase AC electrical machine from a single phase AC power source, the power converter comprising:
    an adjustable speed drive (ASD) including:
        a rectifier configured to convert a single-phase AC power to DC power on a DC bus, the DC bus having first and second rails to provide a relatively fixed DC voltage, and a DC bus capacitor across the first and second rails to smooth voltage ripple; and
        an inverter for receiving DC power from the DC bus and converting the DC power to a three-phase AC power, the inverter comprising a plurality of switches that are selectively controllable to control current flow and terminal voltages in the three-phase AC electrical machine; and
    an add-on power conversion module external to the ASD and electrically connected to each of the single phase AC power source and the ASD, the add-on power conversion module including:
        one or more input inductors each comprising an input end and an output end, with each of the one or more input inductors configured to store and filter single-phase AC power received from the single phase AC power source; and
        a pair of switching devices connected to each of the one or more input inductors at the output end thereof; and
    a controller operably connected to the add-on power conversion module to selectively control switching of the pair of switching devices associated with each of the one or more input inductors so as to cause a sinusoidal single phase AC power to be output from the add-on power conversion module for rectification by the rectifier.

2. The power converter of claim 1 wherein the rectifier comprises a three phase rectifier bridge that includes three bridge legs each having an upper diode and a lower diode positioned thereon.

3. The power converter of claim 2 wherein the ASD further comprises three input terminals for providing AC power to the rectifier bridge, wherein the input terminals are tied together and connected to midpoints of one or more of the three bridge legs.

4. The power converter of claim 1 wherein the upper diodes of the three phase rectifier bridge and the lower diodes of the three phase rectifier bridge are paralleled so as to share AC power input received by the rectifier, with the paralleling of the upper diodes and the lower diodes equally dividing a full load current of the AC power input to the rectifier.

5. The power converter of claim 1 wherein the one or more input inductors comprises a single input inductor, and wherein a single pair of switching devices is connected to the single input inductor at the output end thereof.

6. The power converter of claim 1 wherein the one or more input inductors comprises three input inductors, and wherein a pair of switching devices is connected to each of the three input inductors at the output end thereof, such that six switching devices are included in the add-on power conversion module.

7. The power converter of claim 6 wherein the controller is programmed to switch the six switching devices in an interleaved fashion to increase the effective switching frequency of the add-on power conversion module.

8. The power converter of claim 1 wherein the controller is programmed to selectively control switching of the pair of switching devices associated with each of the one or more input inductors according to a pulse width modulation (PWM) scheme to cause the sinusoidal single phase AC power to be output from the add-on power conversion module.

9. The power converter of claim 1 wherein the ASD further comprises an outer housing configured to house the rectifier and the inverter therein, and wherein the add-on power conversion module positioned external to the outer housing of the ASD.

10. The power converter of claim 1 wherein the ASD is free of DC chokes on the DC bus, with functions of the DC chokes on the DC bus being performed by the one or more input inductors.

11. The power converter of claim 1 wherein a total harmonic distortion of the sinusoidal single phase AC power output from the add-on power conversion module is less than 5%.

12. A method for operating a three-phase AC electrical machine from a single phase power source, the method comprising:
providing a single phase AC power to an add-on power conversion module, the add-on power conversion module comprising:
one or more input inductors each comprising an input end and an output end; and
a pair of switching devices connected to each of the one or more input inductors at the output end thereof; and
selectively switching each of the pair of switching devices associated with each of the one or more input inductors via an operably connected controller so as to cause a sinusoidal single phase AC power to be output from the add-on power conversion module;
providing the sinusoidal single phase AC power to an adjustable speed drive (ASD) separate from and operably connected to the add-on power conversion module; and
generating a three-phase AC power via the ASD for operating the three-phase AC electrical machine, with the ASD rectifying the sinusoidal single phase AC power to generate a DC power and inverting the DC power to generate the three-phase AC power.

13. The method of claim 12 wherein providing the sinusoidal single phase AC power to the ASD comprises providing the sinusoidal single phase AC power in parallel to upper and lower diodes on each of three bridge legs of a rectifier bridge of the ASD, with a single tied input of the ASD providing the sinusoidal single phase AC power in parallel to the upper and lower diodes.

14. The method of claim 13 wherein the input of the ASD is connected to a midpoint of each of the three bridge legs of the rectifier bridge to provide the sinusoidal single phase AC power in parallel to the upper or lower diodes on the three bridge legs, or the input of the ASD is connected to a midpoint of two of the three bridge legs of the rectifier bridge to provide the sinusoidal single phase AC power in parallel to two of the upper or lower diodes on the three bridge legs.

15. The method of claim 13 wherein the input of the ASD is connected to a midpoint of each of the three bridge legs of the rectifier bridge to provide the sinusoidal single phase AC power in parallel to the upper or lower diodes on the three bridge legs, or the input of the ASD is connected to a midpoint of one of the three bridge legs of the rectifier bridge to provide the sinusoidal single phase AC power to the same leg of the upper or lower diode on the three bridge legs, while the midpoints of the other two legs are disconnected.

16. The method of claim 12 wherein the one or more input inductors comprises a single input inductor, and wherein a single pair of switching devices is connected to the single input inductor at the output end.

17. The method of claim 12 wherein the one or more input inductors comprises three input inductors, and wherein a pair of switching devices is connected to each of the three input inductors at the output end thereof, such that six switching devices are included in the add-on power conversion module; and
wherein selectively switching each of the pair of switching devices via the operably connected controller comprises switching the six switching devices in an interleaved fashion to increase the effective switching frequency of the add-on power conversion module.

18. The method of claim 12 wherein, in, generating a three-phase AC power via the ASD for operating the three-phase AC electrical machine, the ASD is de-rated between 0% to less than 50%.

19. A power converter for operating a three-phase AC electrical machine from a single phase AC power source, the power converter comprising:
an adjustable speed drive (ASD) having an input connectable to an AC power source and a three phase output connectable to an input terminal of a load, the ASD comprising a housing enclosing a rectifier and inverter operable to provide a three-phase AC output to the load; and
an add-on power conversion module positioned external to the housing of the ASD and being electrically connected to each of the single phase AC power source and the ASD, the add-on power conversion module including:
one or more input inductors positioned at an input of the add-on power conversion module connected to the single phase AC power source; and
a pair of switching devices connected to each of the one or more input inductors at an output end thereof; and
a controller operably connected to the add-on power conversion module to selectively control switching of the pair of switching devices associated with each of the one or more input inductors;
wherein the controller is programmed to control switching of the pair of switching devices so as to cause a sinusoidal single phase AC power to be output from the add-on power conversion module, the sinusoidal single phase AC power output having a total harmonic distortion of less than 5%.

20. The power converter of claim 19 wherein the rectifier of the ASD comprises a three phase rectifier bridge that includes three bridge legs each having an upper diode and a lower diode positioned thereon; and
wherein the upper diodes of the three phase rectifier bridge and the lower diodes of the three phase rectifier bridge are paralleled so as to share AC power input received by the rectifier through a tied input terminal, with the paralleling of the upper diodes and the lower diodes equally dividing a full load current of AC power input to the rectifier.

21. The power converter of claim 19 wherein the one or more input inductors and the pair of switching devices connected to each of the one or more input inductors comprises:
- a single input inductor and a single pair of switching devices connected to the single input inductor at the output end thereof; or
- three input inductors and a pair of switching devices connected to each of the three input inductors at the output end thereof, such that a pair of switching devices is provided on each of three bridge legs in the power conversion module.

* * * * *